United States Patent
Kimura

(10) Patent No.: US 9,055,172 B2
(45) Date of Patent: Jun. 9, 2015

(54) COMMUNICATION APPARATUS, METHOD FOR CONTROLLING THE SAME, STORAGE MEDIUM, AND PRINTING APPARATUS

(71) Applicant: CANON KABUSHIKI KAISHA, Tokyo (JP)

(72) Inventor: Tomohiro Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/533,186

(22) Filed: Nov. 5, 2014

(65) Prior Publication Data

US 2015/0055163 A1    Feb. 26, 2015

Related U.S. Application Data

(63) Continuation of application No. 14/196,335, filed on Mar. 4, 2014, now Pat. No. 8,913,280.

(30) Foreign Application Priority Data

Mar. 15, 2013    (JP) .................................. 2013-054145

(51) Int. Cl.
G06F 3/12    (2006.01)
G06F 15/00    (2006.01)
H04N 1/00    (2006.01)

(52) U.S. Cl.
CPC .......... *H04N 1/00413* (2013.01); *G06F 3/1292* (2013.01); *G06F 3/1236* (2013.01); *H04N 2201/0094* (2013.01); *H04N 2201/0055* (2013.01)

(58) Field of Classification Search
CPC ..... G06F 3/1236; G06F 3/1292; G06F 3/1204
USPC ......... 358/1.13, 1.15, 1.9; 707/622; 455/3.01, 455/3.05, 153.2
See application file for complete search history.

(56) References Cited

U.S. PATENT DOCUMENTS

2013/0286942 A1 * 10/2013 Bonar et al. .................. 370/328
2014/0013139 A1 *  1/2014 Kimura ........................ 713/323

FOREIGN PATENT DOCUMENTS

JP    2012-199884 A    10/2012

* cited by examiner

*Primary Examiner* — Thomas Lett
(74) *Attorney, Agent, or Firm* — Fitzpatrick, Cella, Harper & Scinto

(57) ABSTRACT

A communication apparatus includes a first communication unit for executing direct wireless communication between an external apparatus and the communication apparatus in which one of the external apparatus and the communication apparatus serves as an access point, and a second communication unit for executing communication between the external apparatus and the communication apparatus in a different way from the communication by the first communication unit. If it is determined that the communication which the communication apparatus is executing is the communication by the second communication unit, a selection screen is displayed so as to enable a user to select a desired service, and if it is determined that the communication which the communication apparatus is executing is the communication by the first communication unit, the selection screen is displayed so as to prevent the user from selecting the specific service.

9 Claims, 4 Drawing Sheets

COMMUNICATION APPARATUS, METHOD FOR CONTROLLING THE SAME, STORAGE MEDIUM, AND PRINTING APPARATUS

CROSS REFERENCE TO RELATED APPLICATION

This application is a continuation of U.S. application Ser. No. 14/196,335, filed on Mar. 4, 2014, which claims priority of Japanese Patent Application No. 2013-054145, filed Mar. 15, 2013. The entire disclosures of these prior applications are incorporated by reference herein.

BACKGROUND OF THE INVENTION

1. Field of the Invention

The present invention relates to a communication apparatus, a method for controlling the same, a storage medium, and a printing apparatus.

2. Description of the Related Art

A "Wi-Fi Direct" (registered trademark) standard is established by the Wi-Fi Alliance. "Wi-Fi Direct" defines a protocol for deciding which of communication apparatuses, such as a printing apparatus (communication apparatus) and a PC, serves as an access point or a client. By executing this protocol, it is possible to automatically decide a communication apparatus that will serve as an access point, and a communication apparatus that will serve as a client. Use of this "Wi-Fi Direct" eliminates the need of preparing a separate access point, enabling the communication apparatuses to execute direct wireless communication with each other.

With respect to such a printing apparatus, a user can give an instruction as to whether to perform the direct wireless communication using "Wi-Fi Direct" or indirect wireless communication via an access point of a third party, and can switch between the direct wireless communication and the indirect communication, with the use of an operation panel or the like. Japanese Patent Laid-Open No. 2012-199884 discloses that a plurality of services are provided while switching between "Wi-Fi Direct" and another wireless connection method.

However, the above-described conventional technology has the following problems. That is, if a printing apparatus is operating in a connection method such as "Wi-Fi Direct" (hereinafter, referred to as "direct connection mode") in which the printing apparatus is directly connected to a specific external terminal, the printing apparatus can only communicate with the external terminal directly connected thereto. Accordingly, the printing apparatus operating in the direct connection mode cannot provide a service (for example, e-mail etc.) that needs communication via a third party server other than the external terminal connected to the printing apparatus.

In view of security, it is preferable that the printing apparatus operating in the direct connection mode be communicable only with the external terminal connected thereto in the direct connection mode, instead of operating in a multi-homing mechanism in which the printing apparatus is connected to a plurality of networks. For example, in an environment in which an in-company network and an outside-company network are separated from each other, conventionally, there is concern that, when in-company communication is being executed, an in-company network interface is not available since it is busy in the direct connection mode, and the in-company communication may be executed for the outside of the company.

Furthermore, if the printing apparatus displays, irrespective of the communication mode, all menu items so as to be selectable, the user cannot know that a desired service is not available until selecting a desired service. Therefore, in such an environment, the user may select a menu item that is not executable, resulting in a useless procedure.

SUMMARY OF THE INVENTION

The present invention enables realization of a mechanism of presenting available functions to an operator depending on whether or not a communication apparatus is operating in a direct connection mode, and appropriately restricting use of functions.

One aspect of the present invention provides a communication apparatus capable of providing a plurality of services, comprising: a display unit configured to display a selection screen with which a user selects a desired service from among the plurality of services; a first communication unit configured to execute a direct wireless communication between an external apparatus and the communication apparatus in which one of the external apparatus and the communication apparatus serves as an access point; a second communication unit configured to execute communication between the external apparatus and the communication apparatus in a different way from the communication by the first communication unit; a determination unit configured to determine whether a communication which the communication apparatus is executing is the communication by the first communication unit or the communication by the second communication unit; and a control unit configured to control, if it is determined by the determination unit that the communication which the communication apparatus is executing is the communication by the second communication unit, the display unit so as to display the selection screen such that the user can select a desired service from among the plurality of services, and to control, if it is determined by the determination unit that the communication which the communication apparatus is executing is the communication by the first communication unit, the display unit so as to display the selection screen such that the user cannot select a specific service from among the plurality of services.

Another aspect of the present invention provides a method for controlling a communication apparatus that is capable of providing a plurality of services, the communication apparatus including a first communication unit configured to execute a direct wireless communication between an external apparatus and the communication apparatus in which one of the external apparatus and the communication apparatus serves as an access point, and a second communication unit configured to execute communication between the external apparatus and the communication apparatus in a different way from the communication by the first communication unit, the method comprising: a display unit displaying a selection screen with which a user selects a desired service from among the plurality of services; a determination unit determining whether a communication which the communication apparatus is executing is the communication by the first communication unit or the communication by the second communication unit; and a control unit controlling, if it is determined in the determination that the communication which the communication apparatus is executing is the communication by the second communication unit, the display unit so as to display the selection screen such that the user can select a desired service from among the plurality of services, and controlling, if it is determined in the determination that the communication which the communication apparatus is executing is the communication by the first communication unit, the display unit so as to display the selection screen such that the user cannot select a specific service from among the plurality of services.

Still another aspect of the present invention provides a non-transitory computer-readable storage medium storing a computer program for causing a computer to execute each step of the method.

Yet still another aspect of the present invention provides a printing apparatus comprising the communication apparatus, wherein the specific service is a send function for sending image data to the external apparatus, or a backup function for storing the image data in the external apparatus.

Further features of the present invention will be apparent from the following description of exemplary embodiments with reference to the attached drawings.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Wi-Fi Direct

Figure 1:
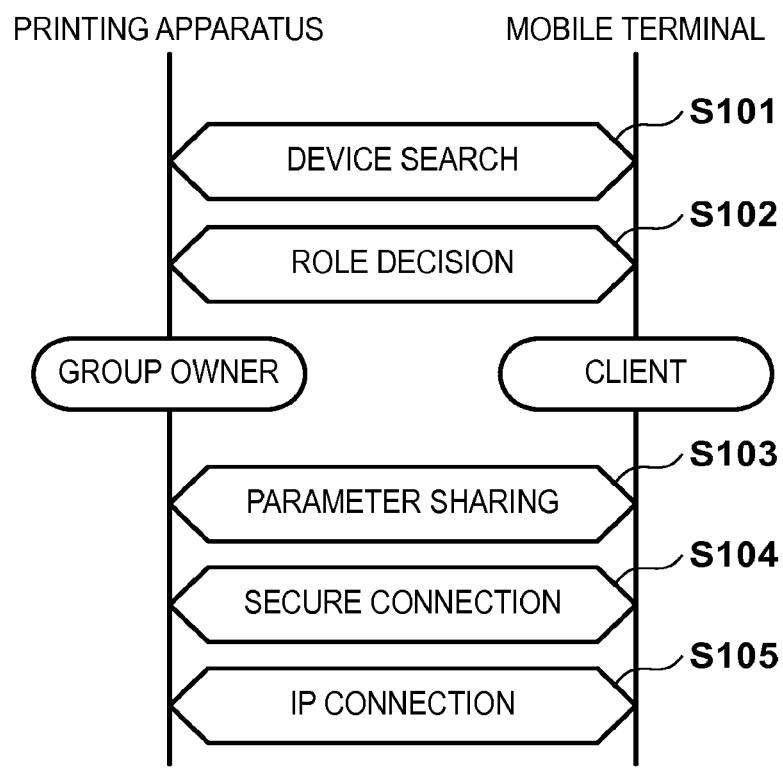
FIG. 1 is a diagram illustrating a processing sequence of "Wi-Fi Direct".

Hereinafter, a processing sequence of "Wi-Fi Direct" will be described with reference to FIG. 1. A printing apparatus and a mobile terminal are respective examples of an information processing apparatus and a communication apparatus that support "Wi-Fi Direct".

First, in step S101, the printing apparatus and the mobile terminal respectively perform device searches in order to specify communication partners. After the respective communication partners were specified by the device searches, it is decided in step S102 which of the printing apparatus and the mobile terminal will serve as an access point (GroupOwner) or as a client (Client). This processing in step S102 is referred to as role decision. In FIG. 1, it is assumed that, as a result of the role decision in step S102, the printing apparatus serves as GroupOwner and the mobile terminal serves as Client.

Next, in step S103, using WPS (Wi-Fi Protected Setup) established by the Wi-Fi Alliance, a parameter for performing connection is provided from the printing apparatus serving as GroupOwner to the mobile terminal serving as Client. With this, the parameter is shared between the printing apparatus and the mobile terminal. Subsequently, in step S104, secure connection is performed using the parameter.

When the secure connection is established, in step S105, addressing for performing IP communication between the printing apparatus and the mobile terminal is executed. At that time, the printing apparatus serving as GroupOwner operates as a DHCP server, and issues IP address to the mobile terminal serving as Client.

By performing the above-described processing, it is possible to establish wireless communication between the printing apparatus and the mobile terminal. Use of this wireless communication enables direct communication between the printing apparatus and the mobile terminal without preparing a separate access point.

First Embodiment

Hereinafter, a first embodiment of the present invention will be described with reference to the drawings. In the present embodiment, priority is placed on setting of a communication-associated security function of the printing apparatus and, if a predetermined setting relating to the security function is configured, use of "Wi-Fi Direct" is inhibited.

Printing Apparatus Configuration

Figure 2:
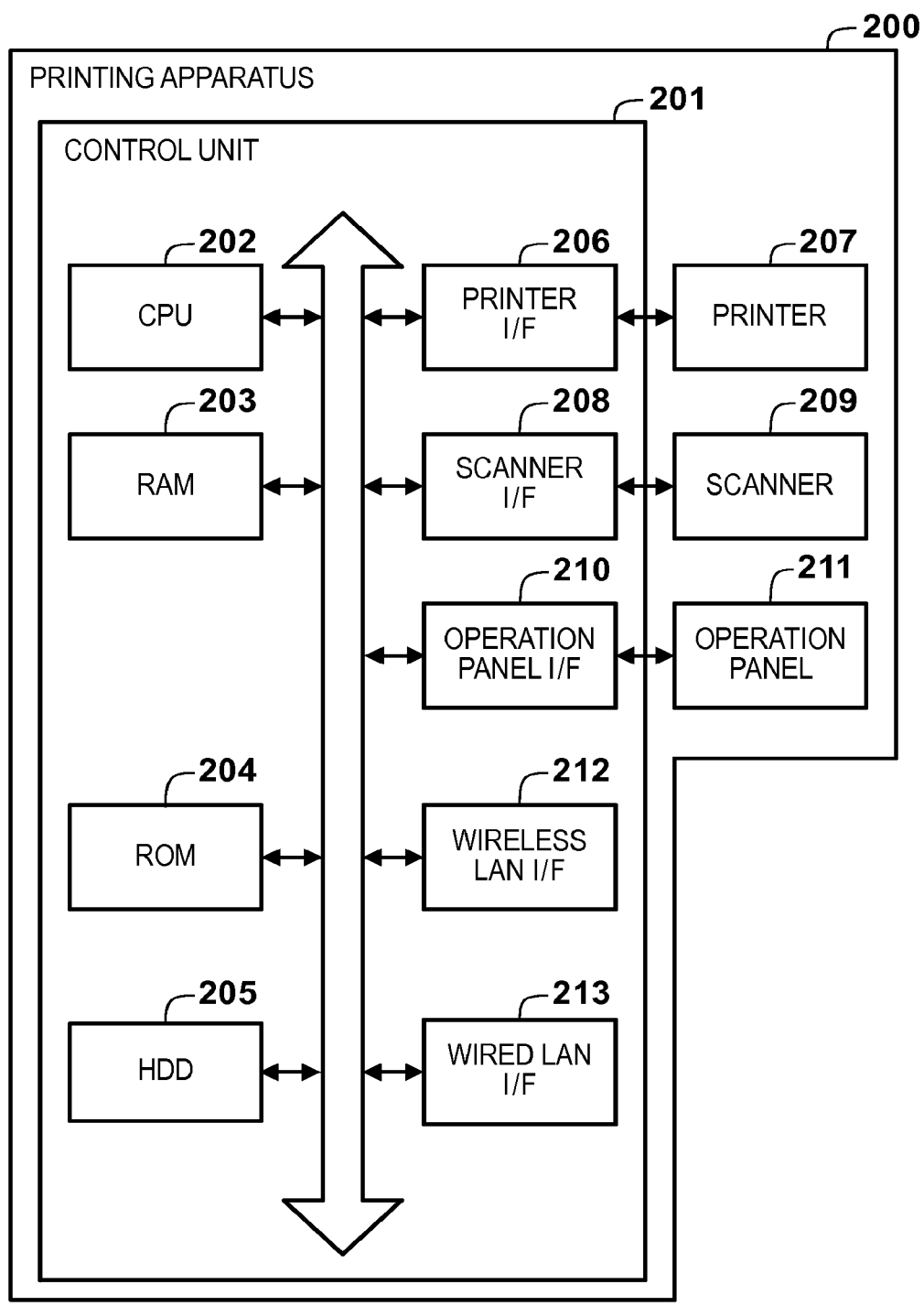
FIG. 2 is a diagram illustrating a hardware configuration of a printing apparatus 200 according to a first embodiment.

Next, a hardware configuration of a printing apparatus 200 will be described with reference to FIG. 2. The printing apparatus 200 is an example of an information processing apparatus or a communication apparatus that can execute wireless communication with an external apparatus (for example, a mobile terminal or a PC). Although description is given in the present embodiment, assuming that the printing apparatus 200 is a multifunctional peripheral, the printing apparatus 200 may be a printer that does not include a scanner but has a function for communicating with an external apparatus. Alternatively, the printing apparatus 200 may be a scanner that does not include a printer but has a function for communicating with an external apparatus. In other words, the present invention is applicable to a communication apparatus that has a function for communicating with an external apparatus.

The printing apparatus 200 includes a control unit 201, a printer 207, a scanner 209, and an operation panel 211. The control unit 201 includes a CPU 202, a RAM 203, a ROM 204, a HDD 205, a printer I/F 206, a scanner I/F 208, an operation panel I/F 210, a wireless LAN I/F 212, and a wired LAN I/F 213.

The control unit 201 including the CPU 202 performs overall control of the printing apparatus 200. The CPU 202 reads out a control program stored in the ROM 204 onto the RAM 203, and performs various types of control such as communication control. The RAM 203 is used as a main memory or a temporary area, such as a work area, for the CPU 202. The HDD 205 has stored therein data and various types of programs, or a table of various types of information.

The printer I/F 206 connects the printer 207 (printer engine) to the control unit 201. The printer 207 executes processing for performing printing on a sheet fed from a sheet feeding cassette (not shown), based on the print data input via the printer I/F 206. The scanner I/F 208 connects the scanner 209 to the control unit 201. The scanner 209 reads an original document placed thereon, generates image data, and outputs the generated image data. The image data output from the scanner 209 is printed by the printer 207, stored in the HDD 205, or sent to the external apparatus via the wireless LAN I/F 212 or the wired LAN I/F 213.

The operation panel I/F 210 connects the operation panel 211 to the control unit 201. The operation panel 211 is provided with a liquid crystal display unit having a touch panel function, a keyboard, various types of function keys, or the like. The user can confirm a screen displayed on the operation panel 211, or can input, using the touch panel, various types of instructions into the printing apparatus 200.

The wireless LAN I/F 212 executes wireless communication with an external apparatus such as a mobile terminal or a PC. With this wireless communication, the printing apparatus 200 receives print data from the external apparatus, and the printer 207 executes print processing based on the received print data. It is also possible to send the image data generated by the scanner 209 to the external apparatus via the wireless LAN I/F 212. The wired LAN I/F 213, to which a LAN cable (not shown) is connected, is capable of executing communication with the external apparatus.

Note that the printing apparatus 200 is assumed to have a configuration in which a single CPU 202 executes, using a single memory (RAM 203), procedures shown by a flowchart that will be described later, but another configuration is also possible. For example, a configuration is also possible in which a plurality of CPUs and a plurality of memories cooperate with each other to execute the procedures shown by the flowchart that will be described later.

Figure 3:
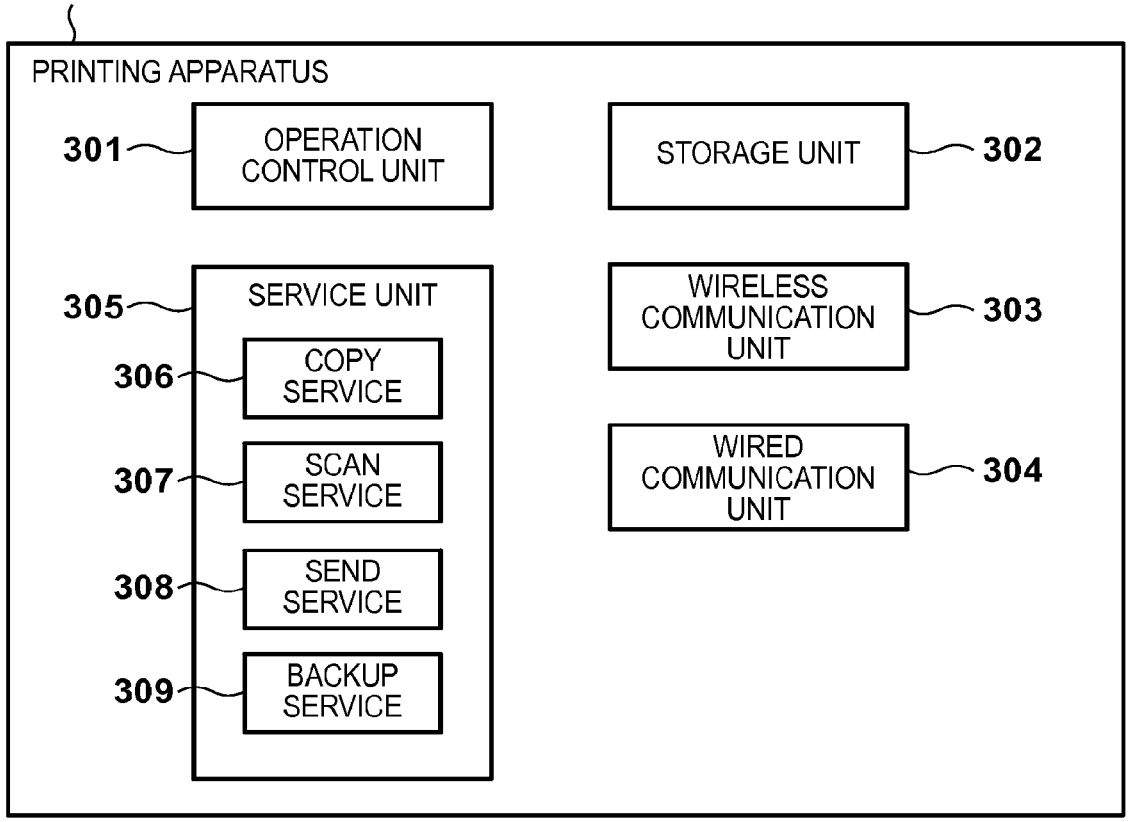
FIG. 3 is a diagram illustrating a software configuration of the printing apparatus 200 according to the first embodiment.

Next, a software configuration of the printing apparatus 200 will be described with reference to FIG. 3. Functional parts shown in FIG. 3 are realized by the CPU 202 executing a control program stored in the ROM 204 or the HDD 205. The printing apparatus 200 includes, as a software configuration, an operation control unit 301, a storage unit 302, a wireless communication unit 303, a wired communication unit 304, and a service unit 305.

The operation control unit 301 controls the operation panel 211. For example, the operation panel 211 is controlled to display an operation screen, or to accept an input of a user instruction via the displayed operation screen. The operation panel 211 is also controlled to notify another functional part of the accepted user instruction, or to update the operation screen to be displayed in accordance with the accepted user instruction.

The storage unit 302 stores designated data in the RAM 203 or the HDD 205, or reads out stored data in accordance with the instruction from another functional part. The wireless communication unit 303 controls the wireless communication executed by the wireless LAN I/F 212. Also, the wired communication unit 304 controls the communication executed by the wired LAN I/F 213. Note that the wireless communication unit 303 has a first communication mode (direct connection mode) and a second communication mode, as communication modes (connection mode) in which the printing apparatus 202 is operable. A first communication mode control unit executes control of "Wi-Fi Direct connection" for executing direct wireless communication. On the other hand, a second communication mode control unit executes control of "AP (access point) connection" for connecting to the access point.

The service unit 305 provides services to a user of the external apparatus (external terminal) such as a mobile terminal or a PC, or of the printing apparatus 200. In the present embodiment, the service unit 305 is constituted by a COPY service (copy function) 306, a SCAN service (scan function) 307, a SEND service (send function) 308, and a BACKUP service (backup function) 309.

The COPY service 306 provides a copy service to the user. Specifically, the COPY service 306 inputs data read out by the scanner 209 or data stored in a memory such as the HDD 205 into the printer 207, and causes the printer 207 to execute processing for printing a copy based on the data. The SCAN service 307 provides a scan service to the user. Specifically, the SCAN service 307 stores data read out by the scanner 209 in the memory such as the HDD 205. Note that since the COPY service 306 and the SCAN service 307 do not need to communicate with the external apparatus, and thus can provide the services irrespective of the communication mode of the printing apparatus 200.

The SEND service 308 provides a service for sending data to the external apparatus. Specifically, the SEND service 308 sends data read out by the scanner 209 or data stored in the memory such as the HDD 205 to the external apparatus. Note that, as a method for transferring the data to the external apparatus, transferring the data using a file transfer protocol, attaching the data to the e-mail, or any other method may be used. The BACKUP service 309 provides a service for storing data stored in the memory in a preset external apparatus. Specifically, the BACKUP service 309 stores electronic data, information such as setting values of the printing apparatus 200, or the like stored in the memory such as the HDD 205, as backup data, in the external apparatus via a network. Also, the BACKUP service 309 reads out the above-described backup data stored in the external apparatus via the network, and reflects the read data on the printing apparatus 200. Note that there may be a case where the SEND service 308 and the BACKUP service 309 cannot provide the services in the direct connection mode since they need to access a third party server other than the device that is directly connected to the printing apparatus 200.

In the present embodiment, description is given, taking the COPY service 306, the SCAN service 307, the SEND service 308, and the BACKUP service 309, as examples of the services provided by the service unit 305, but the present invention is not limited thereto and other services may be provided.

Processing Procedures

Figure 4:
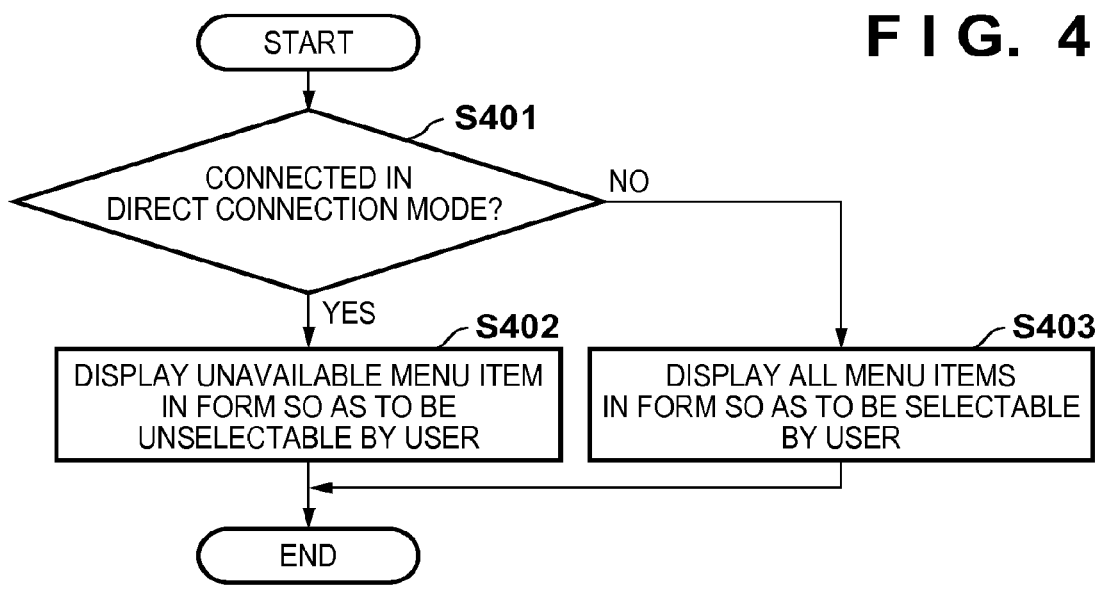
FIG. 4 is a flowchart illustrating processing in which the printing apparatus 200 displays a menu, according to the first embodiment.

Next, processing procedures in which the printing apparatus 200 displays a menu will be described with reference to FIG. 4. The sequence shown in FIG. 4 starts when the printing apparatus 200 is instructed to display on the operation panel 211 a selection screen for selecting a service to be provided. The processing that is described below is realized by the CPU 202 executing a control program stored in the ROM 204 or the HDD 205.

First, in step S401, the CPU 202 determines whether or not the current communication mode is the direct connection mode. This determination is executed by the wireless communication unit 303 and the wired communication unit 304.

If it is determined that the printing apparatus 200 is operating in the direct connection mode, the procedure advances to step S402, where the CPU 202 performs display on the operation panel 211 such that a function that is not operable in the direct connection mode is displayed in a form so as to be unselectable by the user. That is, the printing apparatus 200 displays, on the operation panel 211, only services available in the direct connection mode. An example of the display on the operation panel 211 at that time is denoted by the reference numeral 520 in FIG. 5, which will be described later. Note that the above-described "form so as to be unselectable by the user" may be a form in which the corresponding menu item is displayed in a gray-out state, a form in which the corresponding menu item is not displayed, or another method. Furthermore, a configuration is also possible in which each service is inquired as to whether or not the corresponding service can be provided in the direct connection mode, or information relating thereto is stored in the memory such as the HDD 205.

On the other hand, if it is determined in step S401 that the printing apparatus 200 is operating in a communication mode other than the direct connection mode, the procedure advances to step S403, where the CPU 202 displays, on the operation panel 211, all the services to be provided. An example of the display of the operation panel 211 at that time is denoted by the reference numeral 510 of FIG. 5.

Screen Example

Figure 5:
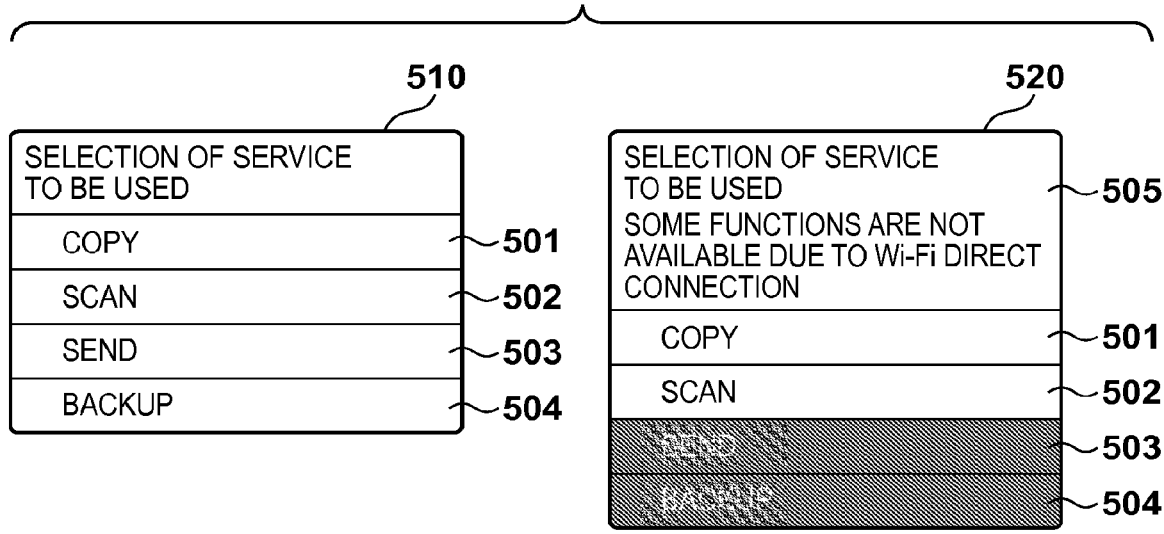
FIG. 5 is a diagram illustrating menus displayed by the printing apparatus 200 according to the first embodiment.

Next, the screen examples displayed by the printing apparatus 200 will be described with reference to FIG. 5. The selection screen 510 is a menu screen of services that is displayed on the operation panel 211 when the printing apparatus 200 operates in a communication mode other than the direct connection mode. That is, the selection screen 510 performs display such that a desired service is selectable from among a plurality of services. In the present embodiment, as described above, the COPY service 306, the SCAN service 307, the SEND service 308, and the BACKUP service 309 are provided. Therefore, on the operation panel 211, the COPY menu 501, the SCAN menu 502, the SEND menu 503, and the BACKUP menu 504 are displayed so as to be selectable. The user can use the COPY service 306 by operating the COPY menu 501. Similarly, the user can use the SCAN service 307 by operating the SCAN menu 502, the SEND service 308 by operating the SEND menu 503, and the BACKUP service 309 by operating the BACKUP menu 504.

The selection screen 520 is a screen of menus of services that is displayed on the operation panel 211 when the printing apparatus 200 operates in the direct connection mode. That is, the selection screen 520 performs display such that unavailable services (menus) can be recognized and are unselectable. The COPY menu 501 and the SCAN menu 502 are displayed so as to be selectable by the user, as with in the selection screen 510. On the other hand, the SEND menu 503 and the BACKUP menu 504 are displayed in a gray-out state so as to be unselectable by the user. Also, in the present embodiment, a message 505 displays a message indicating that some services are not available due to operation in the direct connection mode (Wi-Fi Direct). Note that the message 505 is not essential in the present embodiment.

As described above, according to the present embodiment, a service unavailable in the printing apparatus 200 that is operating in the direct connection mode is displayed in a gray-out state, allowing the user to know that the service is unavailable before execution and operation of the user. Furthermore, by displaying an unavailable service so as to be unselectable, it is possible to prevent an unnecessary procedure from occurring in which the user selects the service unavailable during the direct connection mode when the user uses the printing apparatus 200. Therefore, the user can use a service supported by the printing apparatus without regard to the communication mode in which the printing apparatus is operating. Although the foregoing embodiment has been described in which the printing apparatus 200 and the mobile terminal 300 execute "Wi-Fi Direct" as the wireless communication, the wireless communication is not limited to "Wi-Fi Direct". The present invention is applicable to any wireless communication, like "Wi-Fi Direct", in which a plurality of communication apparatuses can directly communicate with each other.

Second Embodiment

Hereinafter, a second embodiment will be described with reference to FIG. 6. The foregoing first embodiment has described the example in which, when the printing apparatus 200 operates in the direct connection mode, a display form of a menu item of an unavailable service (e.g., the SEND menu 503) is switched. However, in the present embodiment, all the menu items are displayed and, if the SEND menu 503 is selected, the communication mode is then forcibly switched so as to provide the service. Accordingly, in the present embodiment, in step S402, menu items of unavailable services, that is, the SEND menu 503 and the BACKUP menu 504 are displayed on the selection screen 520 while enabling the user to recognize that they are unavailable services, and to select any one of the menus.

Figure 6:
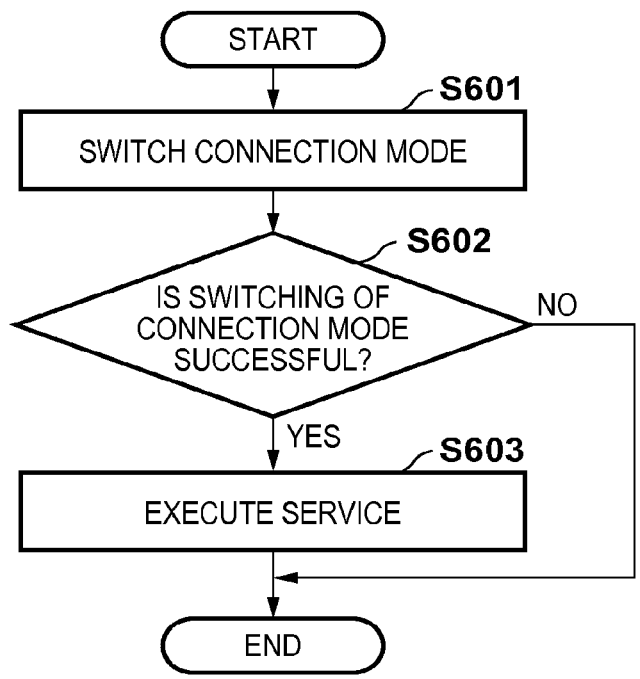
FIG. 6 is a flowchart illustrating processing in which the printing apparatus 200 changes a communication mode, according to a second embodiment.

FIG. 6 shows processing procedures in which the printing apparatus 200 changes the communication mode. The processing shown in FIG. 6 starts when the user selects a service menu item (the SEND menu 503 or the BACKUP menu 504) unavailable in the printing apparatus 200 that is operating in the direct connection. Also, the processing that is described below is realized by the CPU 202 executing a control program stored in the ROM 204 or the HDD 205.

First, in step S601, the CPU 202 switches the connection method from the direct connection mode to the above described communication mode (second communication mode) in which the selected service is available. Note that the CPU 202 has stored, in the memory such as the HDD 205, a communication mode immediately before switching to the direct connection mode or a preset communication mode for normal use, and the above-described stored communication mode is used as a new communication mode to which the direct connection mode is switched in step S601.

Next, in step S602, the CPU 202 determines whether or not the connection is established in the switched communication mode. As a result of the determination, if it is determined that the connection is successfully established, the procedure advances to step S603, where the CPU 202 provides the service selected by the user using the communication in the switched communication mode. Then, when the provision of the service is terminated, the communication mode may automatically be switched to the original direct connection mode. On the other hand, if it is determined that the connection failed, the service selected by the user is not executed, and the processing terminates.

As described above, according to the present embodiment, it is possible to execute a service that is otherwise unavailable in the printing apparatus 200 that is operating in the direct connection mode, by forcibly switching the communication mode before execution and operation of the user, preventing an unnecessary procedure from occurring in which the user selects a service unavailable during the direct connection mode when the user uses the printing apparatus 200. Furthermore, according to the present embodiment, if a function that is typically unavailable during the direct connection mode is selected, it is possible to use the function by forcibly switching the communication mode, and the user no longer needs to recognize the communication mode, allowing a more user-friendly operation system to be provided.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-054145 filed on Mar. 15, 2013, which is hereby incorporated by reference herein in its entirety.

What is claimed is:

1. A communication apparatus capable of providing a plurality of services, comprising:
    a display unit configured to display a service selection screen with which a user selects a desired service from among the plurality of services;
    a determination unit configured to determine whether or not the communication apparatus operates in a direct wireless mode for executing a direct wireless communication between an external apparatus and the communication apparatus in which one of the external apparatus and the communication apparatus serves as an access point; and
    a control unit configured to control, if it is determined by the determination unit that the communication apparatus does not operate in the direct wireless communication mode, the display unit so as to display the service selection screen such that the user can select a desired service from among the plurality of services, and to control, if it is determined by the determination unit that the communication apparatus operates in the direct wireless communication mode, the display unit so as to display the selection screen such that the user cannot select a specific service from among the plurality of services.

2. The communication apparatus according to claim 1, wherein the specific service is unavailable in the communication apparatus if the communication apparatus operates in the direct wireless communication mode.

3. The communication apparatus according to claim 1, wherein the control unit controls, if it is determined by the determination unit that the communication apparatus operates in the direct wireless communication mode, the display unit so as to display the service selection screen such that the specific service is in a gray-out state.

4. The communication apparatus according to claim 1, wherein the control unit controls, if it is determined by the determination unit that the communication apparatus operates in the direct wireless communication mode, the display unit so as to display the selection screen such that the specific service is not displayed.

5. The communication apparatus according to claim 1, wherein the communication apparatus, if it is determined by the determination unit that the communication apparatus operates in the direct wireless communication mode, communicates with the external apparatus using a wireless communication based on Wi-Fi Direct.

6. The communication apparatus according to claim 1, further comprising:
    a reading unit configured to read an original and generate image data, and
    wherein the specific service is a service for transmitting the image data generated by the reading unit.

7. The communication apparatus according to claim 1, wherein the specific service is a backup service for storing, in a storage unit on a network, setting information set to the communication apparatus.

8. A method for a communication apparatus capable of providing a plurality of services, the method comprising:
    displaying a service selection screen with which a user selects a desired service from among the plurality of services;
    determining whether or not the communication apparatus operates in a direct wireless mode for executing a direct wireless communication between an external apparatus and the communication apparatus in which one of the external apparatus and the communication apparatus serves as an access point; and
    controlling, if it is determined by the determining step that the communication apparatus does not operate in the direct wireless communication mode, the displaying such that the user can select a desired service from among the plurality of services, and controlling, if it is determined by the determining that the communication apparatus operates in the direct wireless communication mode, the displaying so as to display the selection screen such that the user cannot select a specific service from among the plurality of services.

9. A non-transitory computer-readable storage medium storing program instructions for performing a method for a communication apparatus capable of providing a plurality of services, the method comprising:
    displaying a service selection screen with which a user selects a desired service from among the plurality of services;
    determining whether or not the communication apparatus operates in a direct wireless mode for executing a direct wireless communication between an external apparatus and the communication apparatus in which one of the external apparatus and the communication apparatus serves as an access point; and
    controlling, if it is determined by the determining step that the communication apparatus does not operate in the direct wireless communication mode, the displaying such that the user can select a desired service from among the plurality of services, and controlling, if it is determined by the determining that the communication apparatus operates in the direct wireless communication mode, the displaying so as to display the selection screen such that the user cannot select a specific service from among the plurality of services.

* * * * *